(12) United States Patent
Kim

(10) Patent No.: US 8,786,805 B2
(45) Date of Patent: Jul. 22, 2014

(54) BACKLIGHT UNIT AND IMAGE DISPLAY APPARATUS

(75) Inventor: Doohee Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 157 days.

(21) Appl. No.: 13/420,118

(22) Filed: Mar. 14, 2012

(65) Prior Publication Data

US 2012/0293745 A1    Nov. 22, 2012

(30) Foreign Application Priority Data

May 16, 2011    (KR) .......................... 10-2011-0045764

(51) Int. Cl.
*G02F 1/1335*    (2006.01)
*G01D 11/28*    (2006.01)
*F21V 7/04*    (2006.01)

(52) U.S. Cl.
USPC .................. 349/65; 349/68; 362/602; 362/26

(58) Field of Classification Search
CPC ............ G02F 1/133615; G02F 1/1336; G02F 2001/133626; G02F 2001/133618; G02F 6/0068; G02F 6/0038
USPC ................................ 349/65, 68; 362/602, 26
See application file for complete search history.

(56) References Cited

U.S. PATENT DOCUMENTS

| | | | |
|---|---|---|---|
| 7,139,053 B2 * | 11/2006 | Yuuki et al. .................... | 349/114 |
| 7,714,952 B2 * | 5/2010 | Chang .............................. | 349/58 |
| 8,154,686 B2 * | 4/2012 | Mather et al. ................... | 349/65 |

* cited by examiner

*Primary Examiner* — Mike Qi
(74) *Attorney, Agent, or Firm* — Birch, Stewart, Kolasch & Birch, LLP

(57) ABSTRACT

A backlight unit according to embodiment comprise of a frame, a light emitting device module disposed on a side of the frame and a plurality of light guide members disposed in the direction of the light irradiated from the light emitting device, wherein the light guide members have light transmissivity and reflectivity different from each other.

20 Claims, 6 Drawing Sheets

BACKLIGHT UNIT AND IMAGE DISPLAY APPARATUS

CROSS-REFERENCE TO RELATED APPLICATION

This application claims the priority benefit of Korean Patent Application No. 10-2011-0045764, filed on May 16, 2011 in the Korean Intellectual Property Office, the disclosure of which is incorporated herein by reference.

BACKGROUND

1. Field of the Invention

Embodiments relate to a backlight unit.

2. Description of the Related Art

A light emitting diode (LED) converts electric signal into a form of a light by using of the characteristic of compound semiconductor. The light emitting diode is used in home appliances, a remote controller, an electronic display, an indicator, all kinds of automation equipments, etc. and an application range of the light emitting diode expands gradually.

Meanwhile, a backlight unit including the light emitting diode may be used in a display apparatus such as a liquid crystal display apparatus. Also, the backlight unit may be used in various lighting apparatus.

Meanwhile, when the backlight unit includes the light emitting diode, a light generated from the light emitting diode needs to be guided for a regular direction. And the backlight unit needs to emit a light uniformly over a display region of the backlight unit. Also, it is important for the backlight unit to be thinner and lighter in order to increase a productivity and a convenience of user.

BRIEF DESCRIPTION OF THE DRAWINGS

Details of embodiments will be more clearly understood from the following detailed description taken in conjunction with the accompanying drawings, in which.

DETAILED DESCRIPTION OF EMBODIMENTS

Figure 1A:
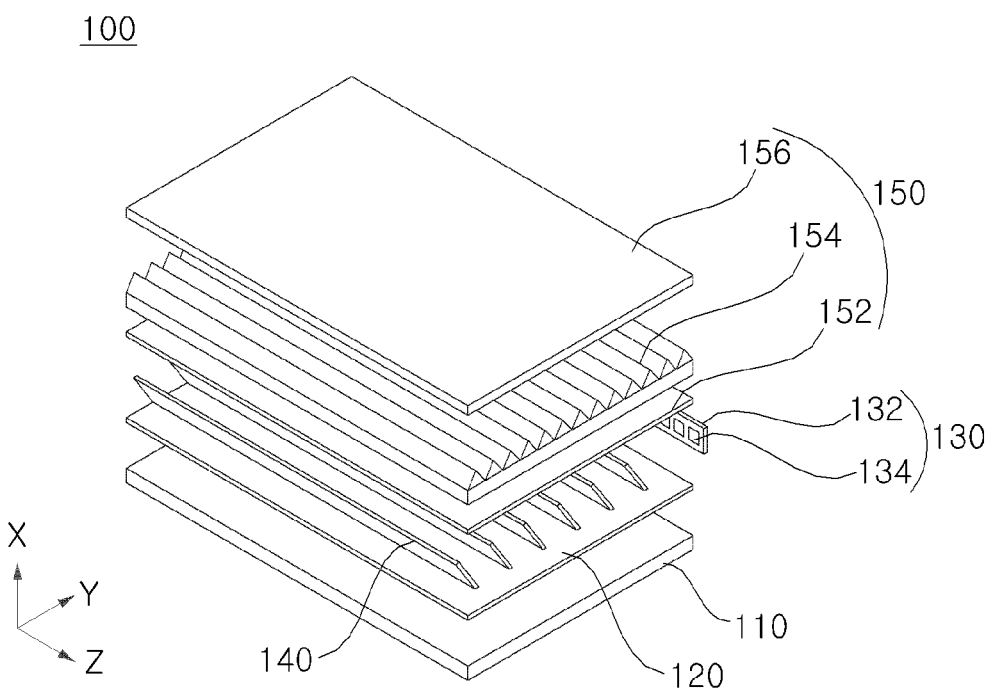
FIG. 1a is an exploded perspective view illustrating a backlight unit according to an embodiment.

Reference will now be made in detail to embodiments, examples of which are illustrated in the accompanying drawings. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art. The present disclosure is defined only by the categories of the claims. In certain embodiments, detailed descriptions of device constructions or processes well known in the art may be omitted to avoid obscuring appreciation of the disclosure by a person of ordinary skill in the art. Wherever possible, the same reference numbers will be used throughout the drawings to refer to the same or like parts.

Spatially-relative terms such as "below", "beneath", "lower", "above", or "upper" may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" or "beneath" other elements would then be oriented "above" the other elements. The exemplary terms "below" or "beneath" can, therefore, encompass both an orientation of above and below. Since the device may be oriented in another direction, the spatially-relative terms may be interpreted in accordance with the orientation of the device.

The terminology used in the present disclosure is for the purpose of describing particular embodiments only and is not intended to limit the disclosure. As used in the disclosure and the appended claims, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness or size of each layer is exaggerated, omitted, or schematically illustrated for convenience in description and clarity. Also, the size or area of each constituent element does not entirely reflect the actual size thereof.

Angles or directions used to describe the structures of light emitting devices according to embodiments are based on those shown in the drawings. Unless there is, in the specification, no definition of a reference point to describe angular positional relations in the structures of the light emitting devices, the associated drawings may be referred to.

Hereinafter, embodiments will be described in detail with reference to drawings.

Figure 1B:
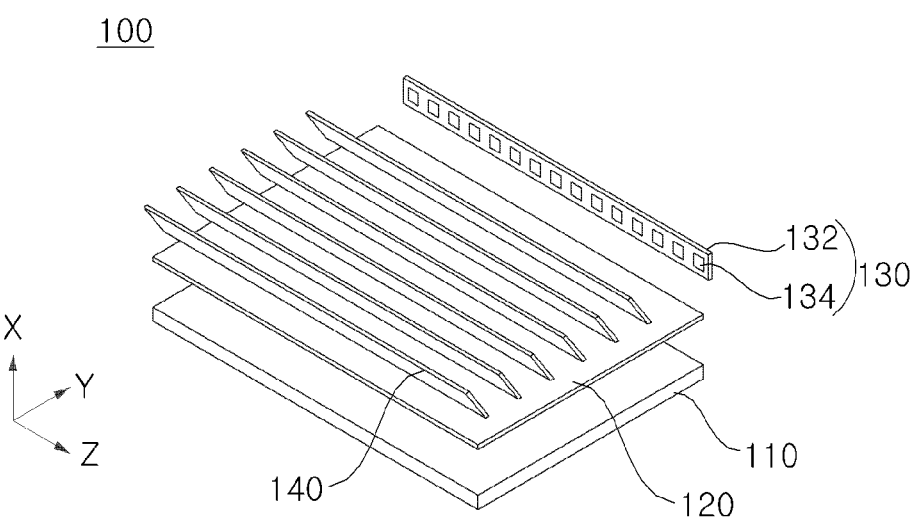
FIG. 1b is a partial exploded perspective view illustrating a part of a backlight unit according to an embodiment.
Figure 1C:
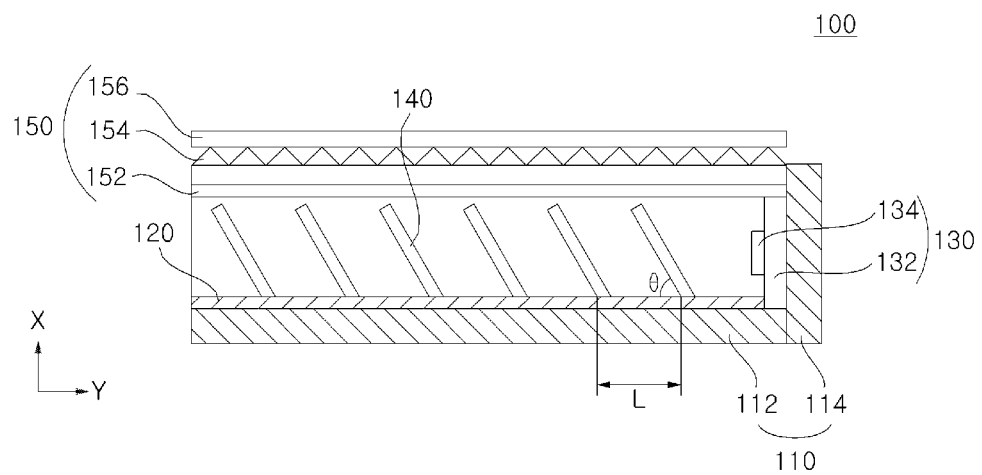
FIG. 1c is a cross-sectional view illustrating a backlight unit according to an embodiment.
Figure 1D:
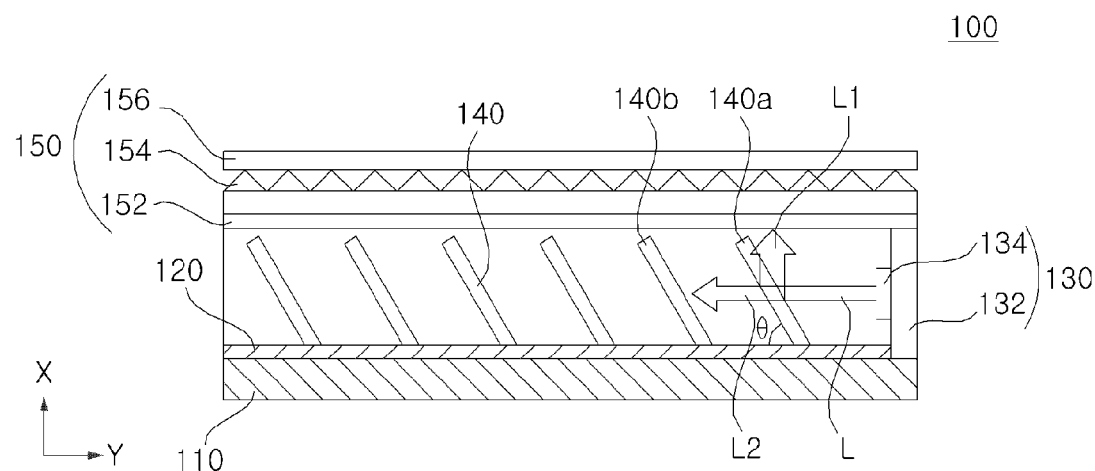
FIG. 1d is a view illustrating a route of light by light guide members of a backlight unit according to an embodiment.

FIG. 1a is an exploded perspective view illustrating a backlight unit according to an embodiment, FIG. 1b is partial exploded perspective view illustrating the backlight unit of FIG. 1a, FIG. 1c is a cross-sectional view illustrating a backlight unit of FIG. 1a, and FIG. 1d is a view illustrating a route of light by light guide members of the backlight unit of FIG. 1a.

Hereinafter, for better understanding, the backlight unit 100 will be described based on a longitudinal direction (Z), a horizontal direction (Y) vertical to the longitudinal direction (Z), and a height direction (X) vertical to the longitudinal direction (Z) and the horizontal direction (Y).

FIG. 1a illustrates an edge-light type backlight unit 100 which includes a frame 110, a light emitting device module 130 disposed on a side of the frame 110, a plurality of light guide members 140 disposed in the direction of the light irradiated from the light emitting device module 130. And, the plurality of light guide members 140 may have light transmissivity and reflectivity different from each other.

The backlight unit 100 supplies a light to a liquid crystal display apparatus (not shown), and it may be disposed on a back surface of the liquid crystal display apparatus (not shown). The backlight unit 100 may supply the light having high brightness and having a proper viewing angle to the liquid crystal display apparatus (not shown).

The frame 110 may support the backlight unit 100. The light guide member 140 and the light emitting device module 130 may be disposed on one region of the frame 110.

Referring to FIG. 1c, the frame 110 may include a light-source supporting part 114 and a bottom part 112. The light-source supporting part 114 may be bent to the bottom part 112. The light emitting device module 130 may be disposed on the light-source supporting part 114 of the frame 110, and the light guide member 140 may be disposed on the bottom part 112 of the frame 110.

The frame 110 may constitute an exterior of the backlight unit 100. The frame 110 may support the light emitting device module 130, a reflection sheet 120, the light guide members 140, and an optical sheet 150.

The reflection sheet 120 may be disposed on an inner side of the frame 110.

The reflection sheet 120 has a predetermined reflectivity, and thus, a light generated from the light emitting device module 130 may proceed to the optical sheet 150. For example, the reflection sheet 120 may include a metal such as Ag and Al having a reflectivity. Also, the reflection sheet 120 may comprise a plurality of transparent layers having refractive index different from each other. But, it is not limited thereto.

Meanwhile, the reflection sheet 120 may be integral with a lower part of the frame 110. Selectively, an inner side surface of the frame 110 may be polished to have reflectivity, and thus, the polished inner side surface may be used for the reflection sheet 120.

The light emitting device module 130 may be disposed on a side of the frame 110. For example, the light emitting device module 130 may be disposed on the light-source supporting part 114 of the frame 110.

The light emitting device module 130 may comprise light emitting device packages 134 and a printed circuit board (PCB) 132, on which the light emitting device packages 134 are mounted to form an array.

The light emitting device module 130 may cross the frame 110 so that the light emitting device packages 134 mounted on the PCB 132 can face the light guide member 140. That is, a surface of the light emitting device module 130 where the light emitting device packages 134 are mounted may face the light guide member 140.

Each of the light emitting device packages 134 includes a light emitting device (not shown) embedded in the light emitting device package 134. Also, the light emitting device packages 134 are mounted on the PCB 132 respectively, and may be electrically connected. Therefore, when a power is supplied to the light emitting device from the outside, a light generated from the light emitting device may be supplied to the light guide member 140, which is horizontal with the light emitting device module 130. Meanwhile, in FIG. 1a to FIG. 1d, the light emitting device packages 134 are mounted on the PCB 132 to form a row. However, it is not limited thereto and the light emitting device packages 134 are formed to have a plurality of rows. Also, the light emitting device packages 134 may be mounted to have a predetermined angle, and the light emitting package 134 may be disposed randomly.

Each of the light emitting device packages 134 may emit a white color light or some chromatic color lights, but it is not limited thereto. For example, the light emitting device package 134 may include R, G, B light emitting devices (not shown) emitting green, blue, and red, but it is not limited thereto. Also, the light emitting device (not shown) mounted on the light emitting device package 134 may be a light emitting diode, but it is not limited thereto.

The PCB 132 includes an electrode pattern (not shown), and the electrode pattern (not shown) may be electrically connected to the light emitting device package 134. Therefore, a power may be supplied to the light emitting device package 134 through the electrode pattern (not shown).

Also, as in the described above, the PCB 132 may be disposed on the frame 110 so that a surface, on which the light emitting device package 134 disposed, faces to the light guide member 140. Meanwhile, the PCB 132 may be a metal printed circuit board(MPCB) having a high heat radiation, but it is not limited thereto.

Meanwhile, in FIG. 1a to FIG. 1d, the light emitting device module 130 is disposed on a side of the frame 110, but it is not limited thereto. And, the light emitting device module 130 may be disposed on the backlight unit 100 irregularly.

The backlight unit 100 may further include the reflection sheet 120 interposed between the light guide member 140 and the frame 110. The light guide member 140 may be disposed on the reflection sheet 120 to be horizontal with the light emitting device module 130.

The light guide member 140 may be fixed on the reflection sheet 120 or the frame 110, but it is not limited thereto.

Meanwhile, in FIG. 1a to FIG. 1d, each of the light guide members 140 are parallel to each other to form a row, selectively, the light guide members 140 may be disposed to form multi-rows or to have a predetermined angle to each other, and an arrangement of the light guide member 140 is not limited thereto. The light guide member 140 may be disposed on the frame 110 to face the light emitting device module 130 for guiding the light irradiated from the light emitting device module 130.

The light guide member 140 may penetrate a part of an incident light and reflect the other part of the incident light with a predetermined angle. Thus, a part of light irradiated from the light emitting device module 130 may be penetrated and transferred to a back of the light guide member 140, and the other part of the light may be reflected and proceed to the optical sheet 150.

For example, the light guide member 140 may be a beam splitter that transmits a part of the incident light from the light emitting device module 130 and reflects the other part of the light to proceed to the optical sheet 150, but it is not limited thereto.

For example, as illustrated in FIG. 1d, a light L irradiated from the light emitting device module 130 enters a first light guide member 140a. Then, a first light L1 that is a part of the light L may be reflected, and a second light L2 that is the other part of the light L may penetrate and proceed straight. Herein, the first light L1 reflected by the first light guide member 140a may go to the optical sheet 150 and be used as effective light. The second light L2 penetrating the first light guide member 140a may proceed straight and may be irradiated to the second light guide member 140b. Also, the second light guide member 140b may penetrate a part of the light. And, the second light guide member 140b may reflect the other part of the light to form an effective light proceeding to optical sheet 150.

As the backlight unit 100 comprises the light guide member 140, a light guide plate (not shown) to change light emitted from the light emitting device module 130 into planar light may be omitted. The light guide plate (not shown) is heavier than the light guide member 140. Thus, as the light guide plate (not shown) is replaced with the light guide member 140, the backlight unit 100 may be light. In whole processes such as a manufacture process, a transportation process and a storage process of the backlight unit 100, costs of the process may be low.

Also, a pattern formed at the light guide plate (not shown) to form the effective light may be omitted. Thus, defective products generated by the pattern formed on the light guide plate may decrease and reliability of the backlight unit 100 may increase.

Also, the light guide plate (not shown) having a predetermined thickness is replaced with the light guide member 140 such that the backlight unit 100 may be thinner.

The light guide member 140 may be plural. Each of the light guide members 140 may have light transmissivity and reflectivity from each other. The light transmissivity and reflectivity of the light guide member 140 may be different according to distance between the light guide member 140 and the light emitting device module 130, but it is not limited thereto. The light guide members 140 neighboring each other may have light transmissivity and reflectivity different from each other.

Also, the light guide member 140 may be disposed to have a predetermined inclination angle Θ with the frame 110 so that a light reflected through the light guide member 140 enters to the optical sheet 150 vertically. The inclination angle Θ may be an acute angle. Also, the inclination angles Θ between the light guide members 140 and the frame 110 are uniform. Meanwhile, the light guide member 140 may be disposed to have inclination angles different from each other, but it is not limited thereto.

The light guide member 140 may have the inclination angle to the bottom part 112 of the frame 110. For example, the light guide member 140 may include a first side that is adjacent to the bottom part 112 and a second side that is apart from the first side, and a distance between the first side and the light emitting device module 130 is smaller than a distance between the second side and the light emitting device module 130. The inclination angles between the light guide members 140 and the bottom part 112 may be the same. As the inclination angles between the light guide members 140 and the bottom part 112 are regular, the light guide member 140 may form uniform light over the backlight unit 100.

Also, the plurality of the light guide members 140 may be apart from each other with a separation distance L. The distance L is a separation distance between neighboring light guide members 140. The light guide members 140 may be apart from each other with an uniform separation distance or different separation distance. The separation distance may be controlled to be uniform or different considering difference of light transmissivity and reflectivity of each of the light guide member 140. A light may be formed uniformly over the backlight unit 100 as the light guide members 140 may be apart from each other with the separation distance.

According to another embodiment, the separation distance L is smaller as the light guide member 140 is far from the light emitting device module 130. By controlling the separation distances L between the light guide members 140, the light, which is weaker as it is far from the light emitting device module 130, may be reflected to the backlight unit as much as possible. Thus, the light emitted from the backlight unit 100 may be uniform.

Also, the light guide members 140 may have light transmissivity and reflectivity different from each other so that a light can be irradiated to all over the backlight unit 100 uniformly.

The light guide member 140 may have a higher light transmissivity and a lower reflectivity as it is closer to the light emitting device module 130.

The rate of increase in the light transmissivity and the rate of decrease in the reflectivity of the light guide member 140 may be a constant. That is, the light transmissivity of the light guide members 140 may increase linearly, and the light reflectivity of the light guide members 140 may decrease linearly. The light guide members 140 may be disposed to have a higher light transmissivity and lower light reflectivity as it is closer to the light emitting device module 130. Also, as the light transmissivity increases linearly and the light reflectivity decreases linearly, the light may be irradiated to all over the backlight unit 100 uniformly.

Figure 2:
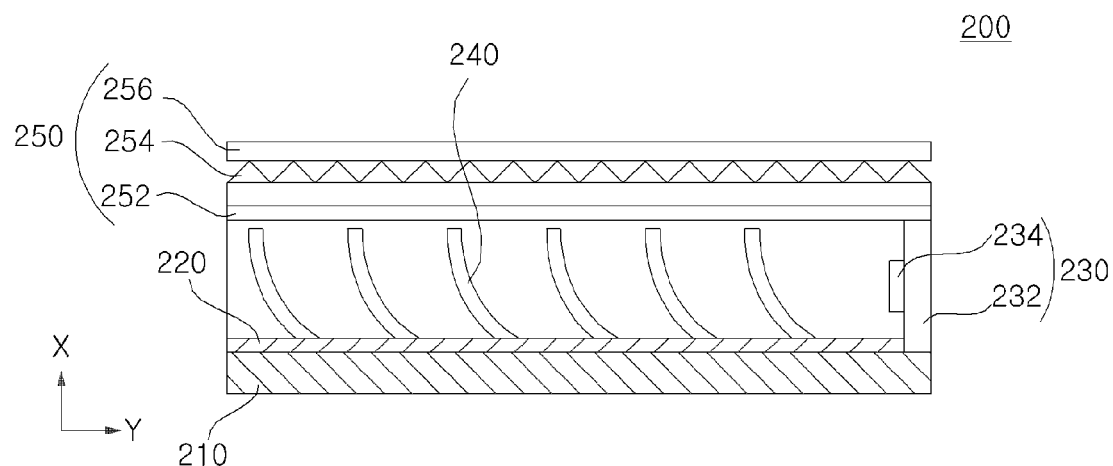
FIG. 2 is a cross-sectional view illustrating a backlight unit according to an embodiment.

FIG. 2 is a cross-sectional view illustrating a backlight unit according to an embodiment.

Meanwhile, as illustrated in FIG. 2, a light guide member 240 may have curvature, and a center of the curvature is at a side on which the light emitting device module 230 disposed. But it is not limited thereto. Also, the curvature of the light guide member 240 may be constant.

As the light guide member 240 has the curvature, an effective light proceeding to the front of the backlight unit 200 may be more uniform. Also, a height of the light guide member 240 may be small such that the backlight unit 200 may be thin.

An optical sheet 250 may disposed on an upper part of the light guide member 240, and the optical sheet 250 may form as a front portion of the backlight unit 200.

The optical sheet 250 may comprise a diffusion sheet 252, and a prism sheet 254. The diffusion sheet may be diffuse an incident light entering from the light guide member 240 into the all over the backlight unit 200, and the prism sheet 254 may be condense the diffused light so as to enhance vertical light incidence. And, the optical sheet 250 may further comprise a protection sheet 256 to protect the prism sheet 254.

The optical sheet 250 may be disposed above the light guide member 240 with a separation distance. Thus, a dark space, which may be generated by contact of the optical sheet 250 and the light guide member 240, may be minimized.

Figure 3:
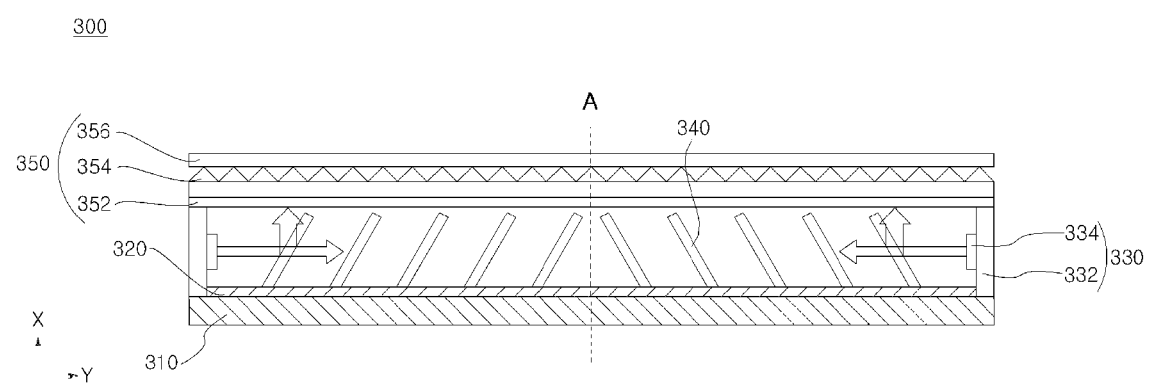
FIG. 3 is a cross-sectional view illustrating a backlight unit according to an embodiment.

FIG. 3 is a cross-sectional view illustrating another backlight unit according to an embodiment.

Referring to FIG. 3, a backlight unit 300 according to the embodiment may include a frame 310, a light emitting device modules 330 disposed on a first side and a second side of the frame 310 opposite to each other, and the light guide members 340 disposed on the frame 310 to have inclination angles with the frame 310. And the plurality of light guide members 340 may have light transmissivity and reflectivity different from each other.

When the light emitting device modules 330 are disposed on the backlight unit 300, an arrangement of the light guide members 340 may be different.

An inclination direction of the light guide members 340 between the first side and a center (A) of the frame 310 is different from that of the light guide members 340 between the second side and the center (A) of the frame 310.

For example, the inclination direction of first light guide members 340 of the plurality of light guide members 340 between the first side and the center (A) of the frame 310 may opposite to the inclination direction of second light guide members 340 of the plurality of light guide members 340 between the first side and the center (A) of the frame 310.

The light guide member 340 may have a larger light transmissivity and a smaller light reflectivity as the light guide member 340 is far from the center (A) of the frame 310.

A light emitted from the front surface of the backlight unit 300 may be uniformalize as the disposition of the light guide members 240 is controlled.

The separation distance between neighboring light guide members 340 may be controlled according to the light transmissivity and reflectivity of the each light guide member 340. For example, the light transmissivity and reflectivity may be one variable, and the separation distance may be another variable. So, above two variables may be controlled to emit uniform light from the all over the front surface of the backlight unit 300.

The light guide members 340 may have light transmissivity and reflectivity different from each other. For example, the light guide members 340 may have a different light transmissivity and reflectivity according to distance between the light guide member 340 and the light emitting device module 330. But, it is not limited thereto.

In the case of embodiment of FIG. 3, the light transmissivity and reflectivity of the light guide members 340, which are apart from the center (A) of the frame 310 with same distance, are the same each other.

Figure 4:
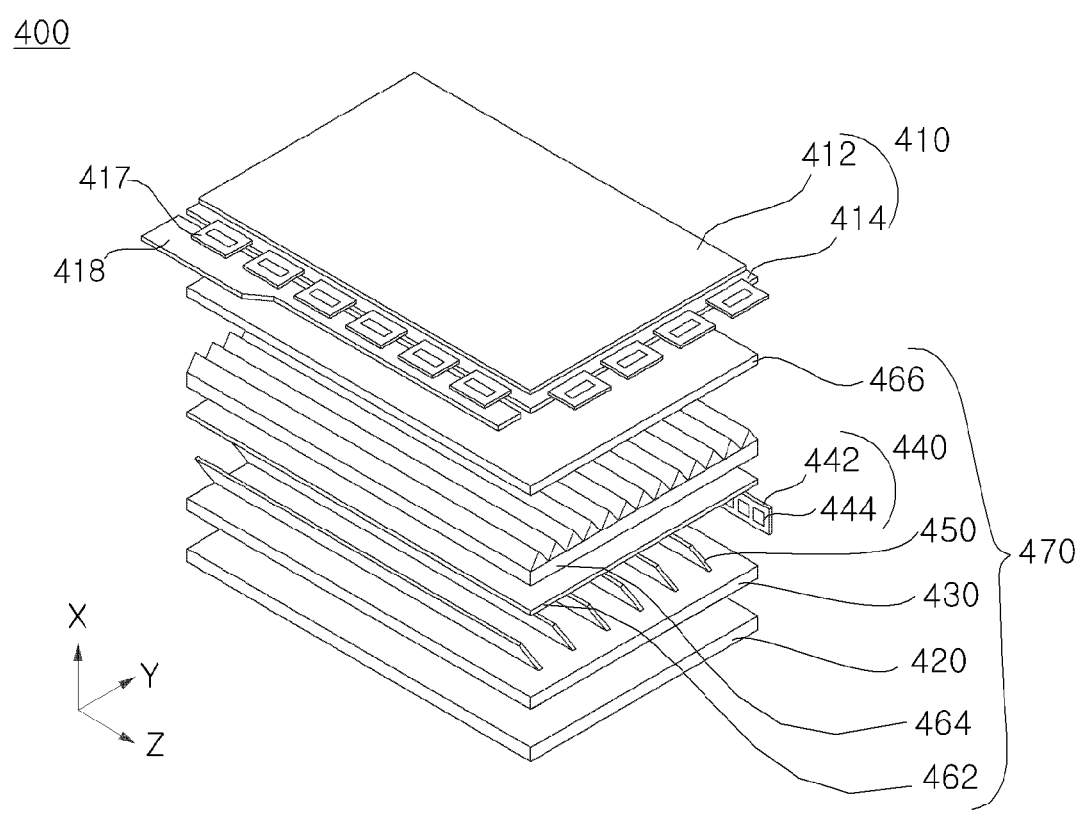
FIG. 4 is an exploded perspective view illustrating a liquid crystal display apparatus including a backlight unit according to an embodiment.

FIG. 4 is an exploded perspective view illustrating a liquid crystal display apparatus including a backlight unit according to an embodiment. The same configuration as that illustrated in FIG. 1a to FIG. 3 and described with reference to FIG. 1a to FIG. 3 will not be repeatedly described in detail.

The liquid crystal display apparatus 400 illustrated in FIG. 4 is an edge-light type and may include a liquid crystal display panel 410 and a backlight unit 470.

The liquid crystal display panel 410 may display an image using the light supplied from the backlight unit 470. The liquid crystal display panel 410 may include a color filter substrate 412 and a thin film transistor substrate 414, which are opposite to each other with liquid crystals interposed therebetween.

The color filter substrate 412 may realize the color of an image displayed on the liquid crystal display panel 410.

The thin film transistor substrate 414 is electrically connected to a PCB 418, on which a plurality of circuit elements is mounted, by means of a drive film 417. The thin film transistor substrate 414 may apply drive voltage provided by the PCB 418 to liquid crystals in response to a drive signal transmitted from the PCB 418.

The thin film transistor substrate 414 may include thin film transistors in the form of a transparent material such as glass or plastic and pixel electrodes.

The backlight unit 470 may include a frame 420, a light emitting device module 420 to emit light, a light guide member 440 to guide the light emitted from the light emitting device module 420 toward optical sheets 462, 464 and 466, a reflection sheet 430 to reflect light going to rearward of the backlight unit 470 toward the optical sheets 462, 464 and 466, and a plurality of optical sheets 462, 464 and 466 to achieve uniformity in brightness distribution and improved vertical incidence of light from the light guide member 450.

A light guide plate to change light emitted from the light emitting device module 440 into planar light may be omitted as the backlight unit 470 includes the light guide member 450. The light guide plate is heavier than the light guide member 450. Thus, as the light guide plate is replaced with the light guide member 450, the liquid crystal display apparatus 400 including the backlight unit 470 may be light. In whole processes such as a manufacture process, a transportation process and a storage process of the liquid crystal display apparatus 400, costs of the process may be low.

Also, a pattern formed at the light guide plate (not shown) to form the effective light may be omitted. Thus, defective products generated by the pattern formed on the light guide plate may decrease and reliability of the liquid crystal display apparatus 400 may increase.

Figure 5:
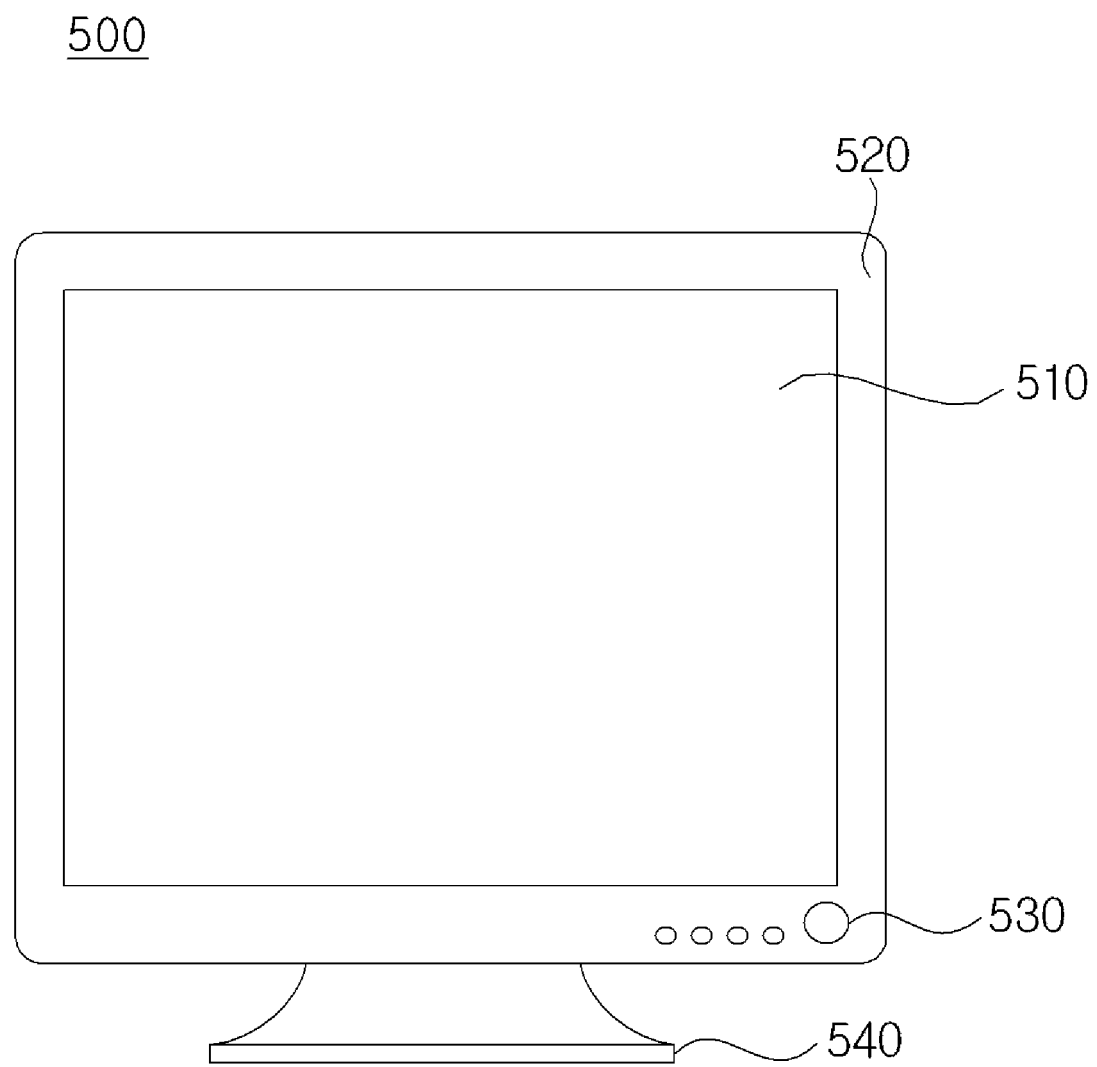
FIG. 5 is a view illustrating an electronic device including a backlight unit according to an embodiment.

FIG. 5 is a view illustrating an electronic equipment including a backlight unit according to an embodiment.

Referring to FIG. 5, the electronic equipment including the backlight unit according to the embodiment may be, for example, a television 500 illustrated in FIG. 5. But, it is not limited thereto.

The television 500 according to the embodiment may include a screen 510 to use a display apparatus, case 520 to protect an built-in electronic device and to surround the screen 510, a control module 530 disposed a side of the case and to be controlled by user convenience, and a supporting part 540 to support the television 500. Also, the screen 510 including a touch panel and so on may be used for an input apparatus as well as the display apparatus.

A liquid crystal display apparatus (not shown) disposed on an inner side of the screen 510, may include the backlight unit (not shown).

As the backlight unit (not shown) includes the light guide member (not shown), the backlight unit may be light and thin. Also, the television may be light and thin. Therefore, manufacturing costs of television 500 may be lowered and productivity of television 500 and user convenience may increase.

As the backlight unit according to the embodiment includes the light guide member, the backlight unit may have a high productivity. For the backlight unit may emit uniform light, the backlight unit may have a high light reliability. Also, defective products generated by the pattern formed on the light guide plate and manufacturing costs may decrease.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
a frame;
a light emitting device module disposed on a side of the frame; and
a plurality of light guide members disposed in a direction of the light irradiated from the light emitting device,
wherein the light guide members have light transmissivity and reflectivity different from each other.

2. The backlight unit according to claim 1, wherein the plurality of light guide members comprises a beam splitter for transmitting a part of the light and reflecting the other part of the light.

3. The backlight unit according to claim 1, further comprising a reflection sheet interposed between the frame and the plurality of light guide members.

4. The backlight unit according to claim 1, wherein the light guide member has larger light transmissivity as it closes to the light emitting device module.

5. The backlight unit according to claim 1, wherein the light guide member has smaller light transmissivity as it closes to the light emitting device module.

6. The backlight unit according to claim 1, wherein the plurality of light guide members are apart from each other with an uniform separation distance.

7. The backlight unit according to claim 1, wherein the light guide member has curvature.

8. The backlight unit according to claim 1, wherein the frame comprises a bottom part and a light-source supporting part bent to the bottom part,
wherein the plurality of light guiding members are disposed on the bottom part, and
wherein the light emitting device module is disposed on the light-source supporting part.

9. The backlight unit according to claim 8, wherein the light guide member comprises a first side that is adjacent to the bottom part and a second side that is apart from the first side, and
wherein a distance between the first side and the light emitting device module is smaller than that between the second side and the light emitting device module.

10. The backlight unit according to claim 1, wherein the light guide member is inclined to the frame with an angle.

11. The backlight unit according to claim 1, wherein inclination angles between the light guide members and the frame are the same.

12. The backlight unit according to claim 1, wherein the plurality of light guide members are apart from each other with a predetermined separation distance and the predetermined separation distance is shorter as the light guide member is far from the light emitting device module.

13. The backlight unit according to claim 1, further comprising an optical sheet disposed on the plurality of light guide members,
wherein the optical sheet is apart from the plurality of light guide members.

14. A backlight unit comprising:
a frame;
a light emitting device module disposed on a first side and a second side of the frame; and
a plurality of light guide members inclined to the frame, wherein the light guide members have light transmissivity and reflectivity different from each other.

15. The backlight unit according to claim 14, wherein an inclination direction of first light guide members of the plurality of light guide members between the first side and a center of the frame is opposite to an inclination direction of second light guide members of the plurality of light guide members between the second side and the center of the frame.

16. The backlight unit according to claim 14, wherein the light guide member has a larger light transmissivity as the light guide member is far from a center of the frame.

17. The backlight unit according to claim 14, wherein the light guide member has a smaller light transmissitivity as the light guide member is far from a center of the frame.

18. The backlight unit according to claim 14, the plurality of light guide members are apart from each other with an uniform separation distance.

19. The backlight unit according to claim 14, the plurality of light guide members are apart from each other with a different separation distance.

20. An image display apparatus comprising:
a back light unit including a frame, a light emitting device module disposed on a side of the frame and a plurality of light guide members disposed in the direction of the light irradiated from the light emitting device, wherein the light guide members have light transmissivity and reflectivity different from each other; and
a liquid crystal display panel disposed on the backlight unit, wherein the liquid crystal comprising a color filter substrate and a thin film transistor substrate opposite to each other.

* * * * *